US012343731B2

(12) United States Patent
McDevitt et al.

(10) Patent No.: US 12,343,731 B2
(45) Date of Patent: Jul. 1, 2025

(54) MOBILE BULK MATERIAL PROCESSING MACHINE WITH DEMOUNTABLE HANGING ASSEMBLY

(71) Applicant: SANDVIK INTELLECTUAL PROPERTY AB, Sandviken (SE)

(72) Inventors: Terry McDevitt, Donegal (IE); Gary Magowan, Ballygawley (IE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 18/242,109

(22) Filed: Sep. 5, 2023

(65) Prior Publication Data

US 2023/0405601 A1 Dec. 21, 2023

Related U.S. Application Data

(63) Continuation of application No. 15/516,262, filed as application No. PCT/EP2014/071263 on Oct. 3, 2014, now abandoned.

(51) Int. Cl.
*B02C 21/02* (2006.01)
*B02C 23/02* (2006.01)
*B02C 23/12* (2006.01)

(52) U.S. Cl.
CPC ............ *B02C 21/026* (2013.01); *B02C 23/02* (2013.01); *B02C 23/12* (2013.01)

(58) Field of Classification Search
CPC ....... B02C 21/02; B02C 21/026; B02C 23/02; B02C 2021/023
See application file for complete search history.

(56) References Cited

U.S. PATENT DOCUMENTS

| | | | | | |
|---|---|---|---|---|---|
| 5,294,065 | A * | 3/1994 | Harms | B28C 9/04 | 241/101.8 |
| 2003/0146315 | A1* | 8/2003 | Boast | B07B 13/16 | 241/34 |
| 2006/0088403 | A1* | 4/2006 | Smith | B65G 41/002 | 414/352 |
| 2008/0302894 | A1* | 12/2008 | Douglas | B02C 21/02 | 241/198.1 |
| 2010/0282568 | A1* | 11/2010 | Whyte | B02C 21/026 | 198/313 |

FOREIGN PATENT DOCUMENTS

| | | | | |
|---|---|---|---|---|
| DE | 20002433 U1 * | 5/2000 | B02C 21/02 |
| WO | WO-2004085071 A1 * | 10/2004 | B02C 21/026 |

OTHER PUBLICATIONS

English translate (DE20002433U1), retrieved date Aug. 4, 2024.*

* cited by examiner

*Primary Examiner* — Mohammed S. Alawadi
(74) *Attorney, Agent, or Firm* — Corinne R. Gorski

(57) ABSTRACT

A mobile bulk material processing apparatus having at least one material processing unit that is mounted at a hanging assembly including a carrier frame suspended from a main frame of the apparatus. The hanging assembly is capable of being connected or disconnected from the mainframe of the machine via a semi-automated process using a plurality of powered actuators acting on first and/or second couplings.

12 Claims, 17 Drawing Sheets

MOBILE BULK MATERIAL PROCESSING MACHINE WITH DEMOUNTABLE HANGING ASSEMBLY

RELATED APPLICATION DATA

This application is a continuation of U.S. patent application Ser. No. 15/516,262 filed Mar. 17, 2017, which is a § 371 National Stage Application of PCT International Application No. PCT/EP2014/071263 filed Oct. 3, 2014.

FIELD OF INVENTION

The present disclosure relates to a mobile bulk material processing apparatus and in particular although not exclusively, to a mobile machine having a hanging assembly that includes at least one material processing unit, the assembly capable of being connected or disconnected from the machine via power operated actuators controlled by a motor.

BACKGROUND

Mobile bulk material processing apparatuses have been developed for a wide variety of applications including the processing of stone, minerals, construction materials and both domestic and industrial waste to generate smaller and/or size categorised aggregate for subsequent processing, use or disposal. For example, in both a quarry or clearance site environment, a mobile crusher is used to crush stone, rubble or site clearance material into smaller pieces. Typically, the crusher is provided with a hopper for receiving the bulk material and a discharge conveyor to transfer the processed and crushed material to a discharge location.

Mobile screening plants also utilize hoppers and discharge conveyors and function to separate the bulk material into one or more screened sized ranges, e.g., sand, ballast and aggregate via a screen box unit. Both screening and crushing plants range in size to suit particular applications with smaller self-propelled screening and/or crushing plants being designed to be readily transportable from one site to another on for example a low loader or by being towed as a trailed vehicle. Accordingly, it is desirable for such processing plants to have operating components that may be adjusted or even disconnected from the main machine either to facilitate transport between sites or to enhance the movability on site. As such, a number of mobile processing plants have been proposed with moving components that can be easily adjusted between different positions.

Example transportable processing plants with folding or pivoting operative components are described in WO 95/12462; EP 0506812; WO 97/41971; WO 02/26403; WO 2004/018106 and WO 2005/099903.

GB 2351247 and US 2003/0146315 disclose processing plants in which an upwardly inclined discharge conveyor and screen may be pivoted between a raised operative position and a lowered transport or maintenance position.

However, conventionally the adjustment of processing units between operative and transport (or maintenance) positions necessitates auxiliary powered apparatus such as lifting cranes and the like, which must be available on site. Additionally, the positional adjustment of the various operative components of the machine is time consuming which is disadvantageous particularly where a machine forms a part of a series of bulk handling units.

Accordingly, what is required is a mobile bulk material processing apparatus having at least one processing unit that may be adjusted conveniently and quickly to address the above problems.

SUMMARY

It is an objective to provide a hanging assembly that includes at least one bulk material processing unit configured to be quickly and conveniently attached and removed from the mobile machine without the need for auxiliary powered lifting equipment. It is a specific objective to provide a 'self-contained' apparatus in which the hanging assembly may be readily connected and disconnected from a mainframe of the mobile machine automatically or semi-automatically with minimal or no manual intervention.

The objectives are achieved by providing a plurality of first and second couplings positioned between the mainframe and the hanging assembly that are respectively coupled to power operated actuators configured to move at least one of the first and second couplings relative to one another to provide powered engagement and disengagement. The first and second couplings are specifically configured to automatically couple and decouple from one another by movement controlled by the power operated actuators. Manual intervention and the need for auxiliary equipment is accordingly avoided to achieve connection and disconnection of the hanging assembly at the mainframe.

The motor that powers the actuation of the first and second couplings may be mounted at the mainframe of the mobile machine and is the same motor that provides drive of endless tracks or wheels to allow the apparatus to move over the ground. Optionally, the apparatus may have a secondary motor to power exclusively the movement of the couplings mounted at the mainframe of the machine or the hanging unit. The actuators can be hydraulic or pneumatic and the motor is coupled to a control fluid network to provide transport of the fluid relative to the actuators as will be appreciated by those skilled in the art. The actuators can be hydraulic cylinders, although the subject apparatus is compatible with all types of mechanical, electromagnetic, and fluidic operated actuators.

According to a first aspect, there is provided a mobile bulk material processing apparatus including: a mainframe mounting endless tracks or wheels to allow the apparatus to move over the ground; a hanging assembly having at least one material processing unit and a carrier frame, the carrier frame suspended from the mainframe via at least one support structure; a plurality of first couplings provided at the support structure and a plurality of complementary second couplings provided at the hanging assembly to releasably engage the first couplings to suspend the hanging assembly at the mainframe; a plurality of power operated actuators acting on the first and/or second couplings and powered by a motor to move at least one of the first and second couplings relative to one another to provide powered engagement and disengagement between the first and second couplings and to allow the hanging assembly to be connected and disconnected from the mainframe.

Optionally, at least some of the first and/or second couplings have hooked members and at least some of the alternate second and/or first couplings including abutments being releasably engageable by the hooked members. Optionally, the hooked members may be formed as claws or forks where the abutments may optionally be formed as engageable pins, bars, lugs, studs or notches against which the hooked members may engage and at least partially surround. Such a configuration is advantageous to provide the automatic engagement and disengagement between the first and second couplings and to provide a secure connection once fully engaged by virtue of the hooked end passing around each abutment.

Optionally, at least one of the hooked members is pivotally mounted at the support structure and at least one of the power operated actuators is configured to act on the hooked member to pivot the hooked member into and from engagement with at least one abutments at the hanging assembly. Pivotally mounting at least one of the hooked members for operative engagement and disengagement is advantageous to ensure a secure coupling is achieved between the mainframe and the hanging assembly. Optionally, at least some of the couplings may be configured to move linearly and to pivot or rotate relative to the alternate coupling via one or more of the power operated actuators.

The hanging assembly has at least one pair of telescopic arms mounted to extend from the carrier frame, each arm having one of the second couplings. The telescopic arms provide a means of conveniently moving the second couplings relative to the first couplings by extension or retraction of the arms. The carrier frame includes at least a pair of second couplings provided at one end of the carrier frame. The second couplings at the telescopic arms and the carrier frame include hooked members. The telescopic arms may be pivotally mounted at the carrier frame and are maintained in a generally inclined angle relative to the carrier frame. The hooked members of the carrier frame may be orientated such that the hooked ends point generally downwards towards the ground.

The first couplings at the support structure have abutments that are releasably engageable by the hooked members at the telescopic arms and the carrier frame. Such an arrangement provides a convenient and rapid connection and disconnection between the telescopic arms, the carrier frame and the support structure/mainframe. This may be achieved conveniently by raising and lowering the hooked members at the telescopic arms of the carrier frame relative to the abutments at the support structure.

At least one pair of the power operated actuators are coupled to the respective telescopic arms to extend and retract the arms relative to the carrier frame to move the hooked members relative to the abutments. Each telescopic arm includes a respective power operated actuator coupled between each arm of the carrier frame to both extend and retract each telescopic arm and accordingly raise and lower the second coupling (at the end of each telescopic arm) relative to the first couplings at the support structure.

The carrier frame has a plurality of jacking legs capable of being raised and lowered in contact with the ground to support the hanging assembly as a free standing unit on the ground and a plurality of the power operated actuators coupled to the jacking legs to actuate the raising and lowering of the legs relative to the carrier frame. The powered jacking legs are a convenient and reliable means of raising and lowering the entire hanging unit when contacted on the ground so as to move the second couplings from the hanging assembly relative to the first couplings at the support structure. That is, at least some or potentially all of the respective first and second couplings may be engaged and disengaged via the raising and lowering of the jacking legs when supported on the ground.

The jacking legs also allow the hanging assembly to be a free standing unit, independent of the mainframe and remainder of the powered mobile machine. Accordingly, the carrier frame includes a pair of jacking legs provided at a rearward end of the carrier frame, the rearward end intended for coupling to the support structure. The carrier frame further includes a plurality of support legs positioned towards a front end of the carrier frame, which are configured to be manually raised and lowered independently of the hydraulic actuation of the jacking legs.

Optionally the hanging assembly includes two jacking legs and two power operated actuators, in the form of hydraulic cylinders, acting on the jacking legs. Both the jacking legs and support legs of the carrier frame include means to mechanically fix and lock the legs at any extended or retracted position.

Optionally, the support structure includes a slewing arm mounting one of the first couplings and the hanging assembly includes a recirculation conveyor mounting one the second couplings to releasably engage the first coupling of the slewing arm. Optionally, the first coupling of the slewing arm may have a hooked member and the second coupling of the recirculation conveyor have an abutment, the slewing arm further including one of the power operated actuators to act on the hooked member to releasably engage the abutment. The slewing arm is mounted at the mainframe via a slewing ring aligned generally horizontally (that is having a central slewing axis that is aligned substantially vertically) when the machine is positioned on level ground. The slewing arm is preferably configured to suspend the recirculation conveyor via engagement between the first and second couplings such that the recirculation conveyor may be conveniently slewed laterally outward relative to the mainframe.

The slewing arm is configured to also bring the recirculation conveyor into substantially parallel alignment with the carrier frame to allow the recirculation conveyor to be releasably and mechanically attached to one side of the carrier frame. Advantageously the recirculation conveyor may be mounted exclusively at the carrier frame via mechanical attachments when the first and second couplings (provided at the respective slewing arm and recirculation conveyor) are disconnected. Such an arrangement is convenient to 'park' the recirculation conveyor at the hanging assembly.

Optionally, the material processing unit has at least one screen and the hanging assembly further including a discharge conveyor mounted below the screen. The material processing unit may have a feeder unit, a supply conveyor, a plurality of screens, an input hopper, a grizzly, a supply or discharge chute and/or any other material processing component used in the transportation or processing of bulk material.

The material processing unit includes a transfer conveyor positioned to transfer material from the screen to the recirculation conveyor. The transfer conveyor is configured to pivot or be moveable between a widthwise inclined working position and a substantially horizontal position to allow maintenance access.

The apparatus further includes a plurality of locking members positioned at the first and/or second couplings to releasably lock the first and second couplings in engagement. Locking members may be releasably engageable locking pins that can be inserted and removed from one or more apertures or bores such that when inserted in position, the first and second couplings may not be disengaged and are mechanically locked together. Such an arrangement avoids unintentional disconnection of all or part of the hanging assembly from the support structure/mainframe.

The locking members are tethered to the support structure or hanging assembly so as to remain connected to the apparatus when unlocked. The apparatus and support structure may have safety harness clip to allow the releasable attachment of a safety harness for personnel required to access regions of the apparatus at elevated positions using a ladder for example.

The hanging assembly may also include fixings to attach access ladders and handles provided at various locations suitable to be grasped by personnel when required to climb onto the apparatus. The hanging assembly and/or the support structure can have notches, apertures, hooks or eyelets to receive and store the locking pins when not in use to lock the couplings together.

The apparatus may have a plurality of connectors to allow the power operated actuators to be coupled and decoupled from a control fluid network provided at the mainframe. If the power operated actuators are hydraulic cylinders, the connectors can include hydraulic multi-connectors of the type found in the art to enable the rapid and convenient coupling and decoupling of the control fluid network from the actuators without loss of the control fluid. Such an arrangement is advantageous to quickly and conveniently configure the hanging assembly to be an independent free standing unit completely separated from the mobile machine. The motor that drives the movement of the first and/or second couplings is mounted at the mainframe or the hanging screen assembly. The apparatus also include a primary motor to drive the endless tracks or wheels, the primary motor also being configured to power the actuators that move the first and/or second couplings relative to one another.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
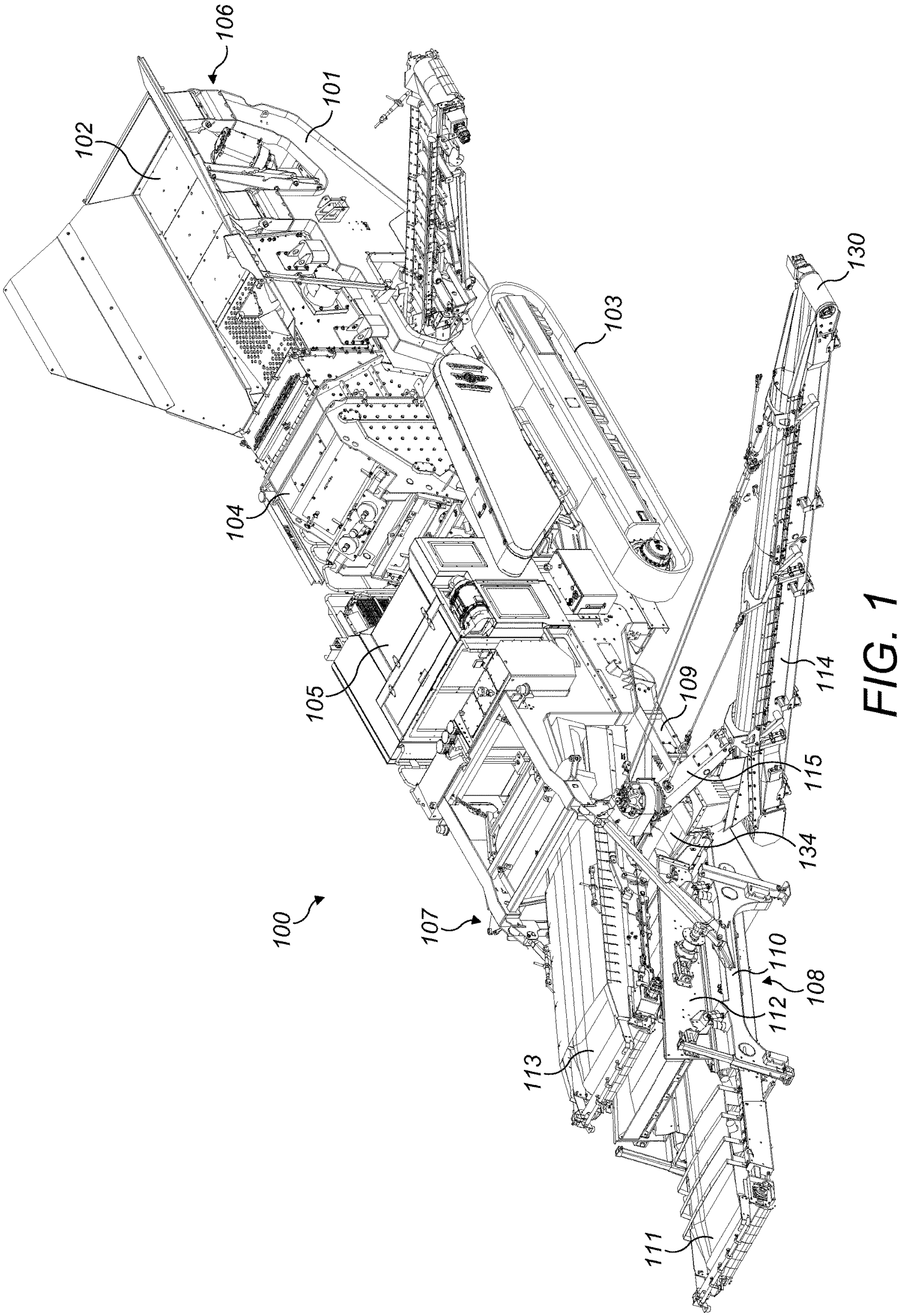
FIG. 1 is a perspective view of a bulk material processing machine mounting primary and secondary processing units where one of the units is suspended from a mainframe of the machine via a demountable hanging assembly according to a specific implementation of the present invention.
Figure 2:
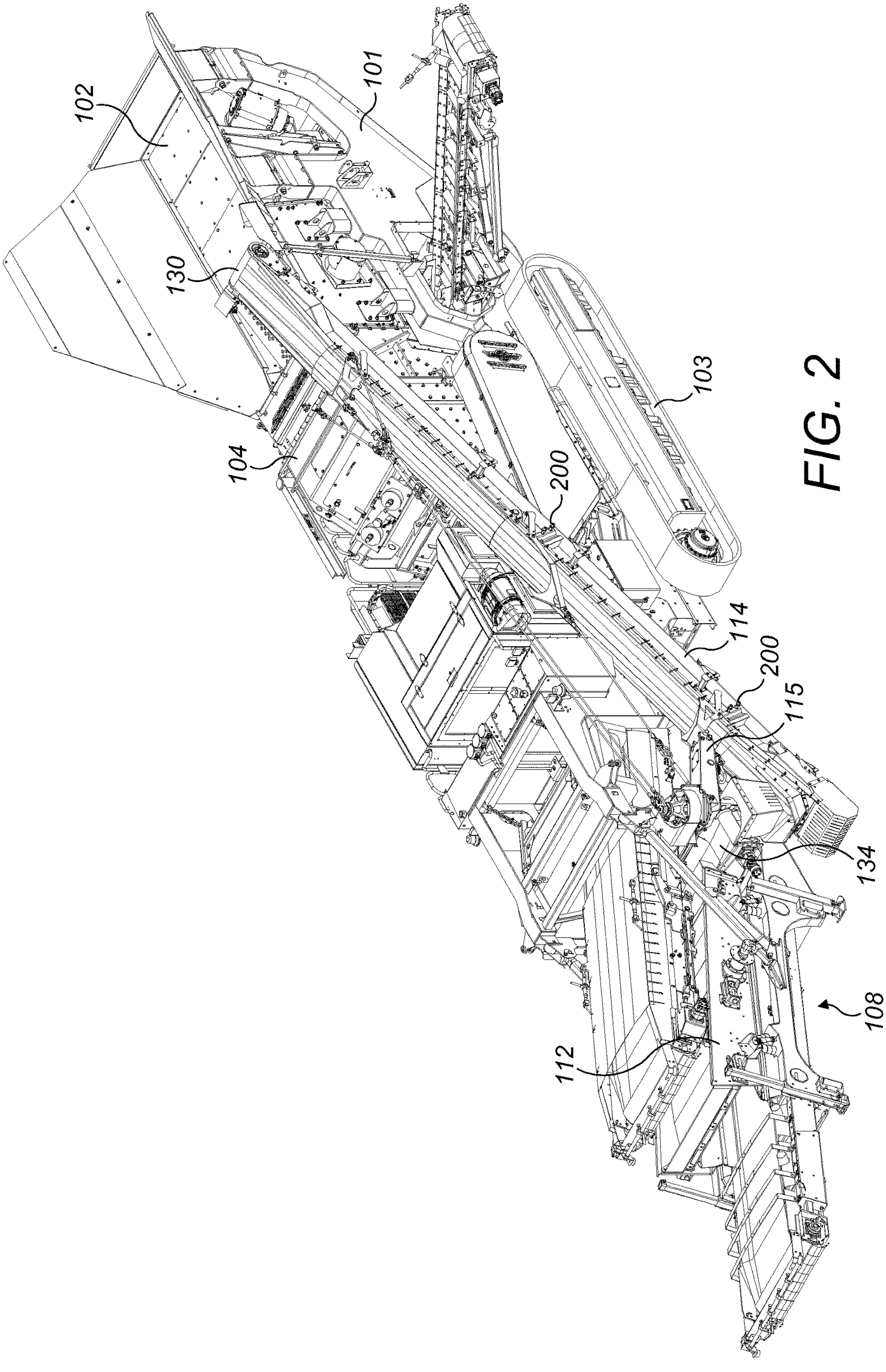
FIG. 2 is a further perspective view of the apparatus of FIG. 1 with a recirculation conveyor positioned longitudinally with the mainframe of the apparatus.

Referring to FIGS. 1 and 2, a mobile bulk material processing machine 100 includes a mainframe 101 that has a forward end 107 and a rearward end 106. An input hopper 102 is provided at rearward end 106 so as to receive bulk material to be processed by machine 100. Mainframe 101 mounts a primary processing unit in the form of a jaw crusher 104 powered by a motor 105 also supported at mainframe 101. A pair of endless tracks 103 are mounted at an undercarriage (not shown) attached to mainframe 101.

A hanging assembly 108 is demountably coupled to machine forward end 107 via a support structure 109. A supply conveyor 113 is mounted at mainframe 101 and extends forwardly from front end 107.

Hanging assembly 108 includes a carrier frame 110 that mounts a screen 112, which is a secondary processing unit of machine 100. Supply conveyor 113 is mounted at mainframe 101 to extend above and supply material to screen 112 from a vibrating feeder (not shown) from below crusher 104. A discharge conveyor 111 is also mounted at carrier frame 110 below screen 112 to discharge screened material for stock piling or onward processing.

Support structure 109 mounts a slewing arm 115 configured to slew laterally outwards over a range of 180° about a substantially vertical axis aligned perpendicular to the lengthwise extending mainframe 101. Slewing arm 115 in turn mounts a recirculation conveyor 114 that is accordingly configured to slew relative to mainframe 101 (and support structure 109).

Apparatus 100 further comprises a transfer conveyor 134 located at the discharge end of screen 112, which is configured to transfer oversized material to recirculation conveyor 114. Accordingly, a discharge end 130 of recirculation conveyor 114 may extend laterally outward to the side of mainframe 101 as shown in FIG. 1 or can be generally aligned with mainframe 101 so as to transport and return material from screen 112 to hopper 102 where it is transferred back to crusher 104 via a vibration feeder to provide material recirculation.

Referring to FIGS. 4 to 6B, support structure 109 is rigidly attached to mainframe 101 via locking attachment bolts and the like and is intended not to be demountable from mainframe 101. Accordingly, support structure 109 may be considered a part of mainframe 101 or an integral extension of mainframe 101. However, according to further specific implementations, support structure 109 may be demountable from mainframe 101 via suitable interconnections.

Figure 3:
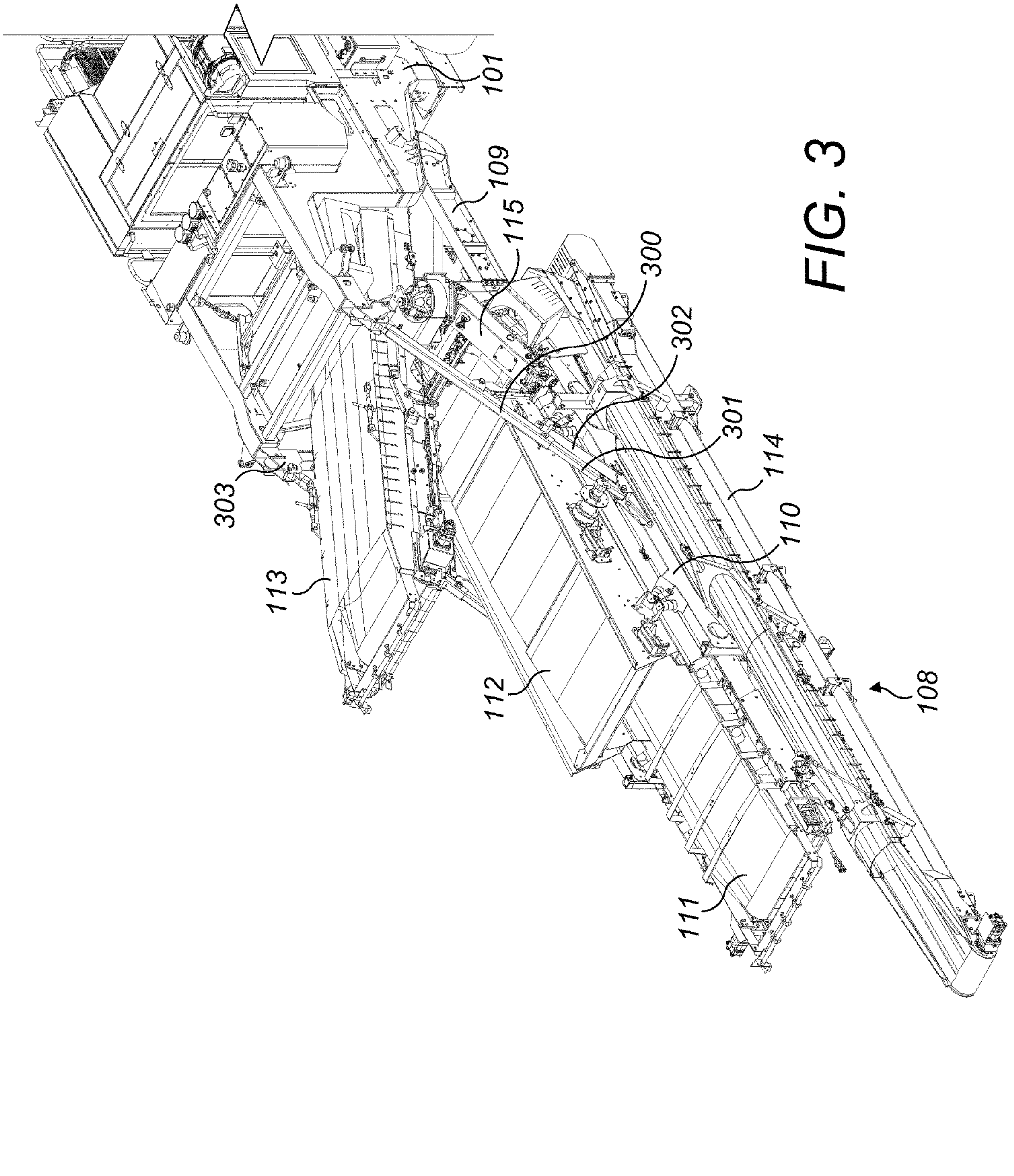
FIG. 3 is a perspective view of the hanging assembly of FIG. 2 in a lowered configuration.
Figure 4:
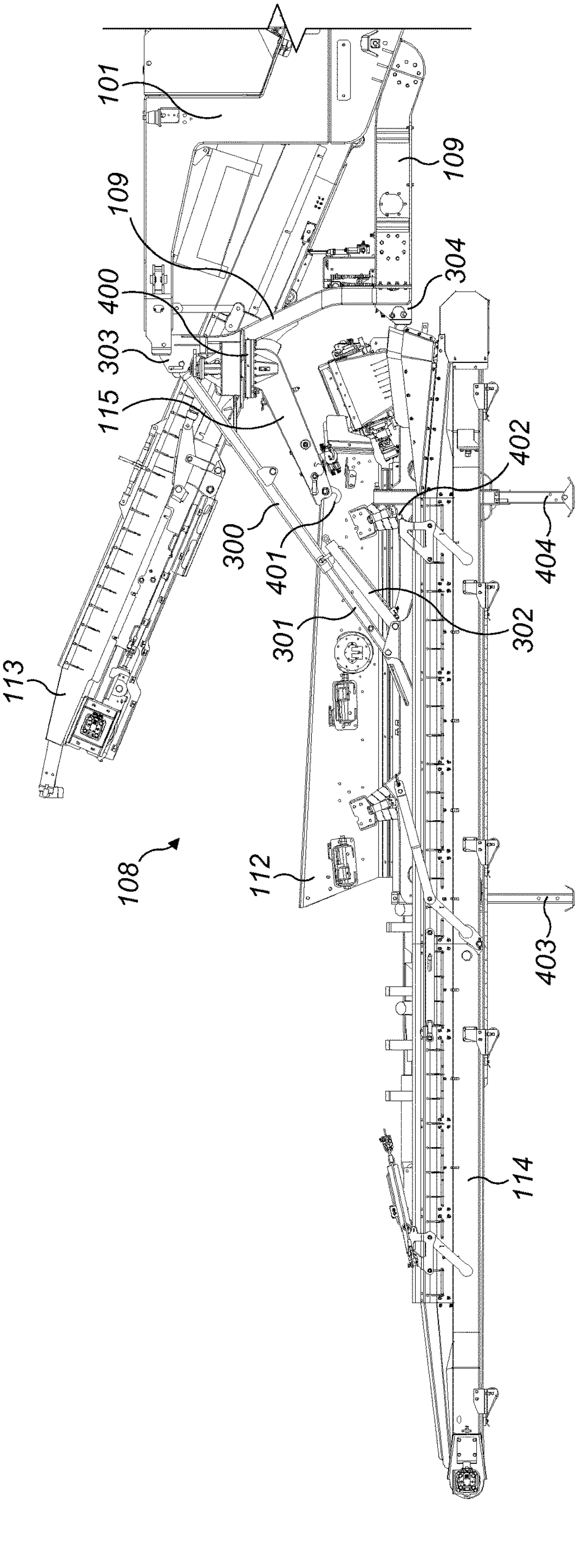
FIG. 4 is a side view of the hanging assembly of FIG. 3 in the lowered position suitable for disconnection from the mobile processing machine.

FIGS. 3 and 4 illustrate hanging assembly 108 lowered in the vertical plane from support structure 109, mainframe 101 and supply conveyor 113. In particular, screen 112, discharge conveyor 111 and recirculation conveyor 114 may be raised and lowered relative to supply conveyor 113 as an integral unit. Additionally, the hanging assembly may be completely disconnected from machine 100 so as to be a free-standing unit as described in detail below.

Carrier frame 110 provides the primary structure of assembly 108 to mount the various material handling components 111, 112, 114, 134. The assembly 108 further includes a pair of telescopic arms 300 that project upwardly and rearwardly at an inclined angle from carrier frame 110 on either side of screen 112 and discharge conveyor 111. Each arm 300 is orientated rearwardly such that an uppermost end is connectable with an uppermost end of support structure 109.

Each arm 300 includes a sliding telescopic rod 301 with the extension and retraction of rod 301 controlled by a powered hydraulic cylinder 302 extending between carrier frame 110 and a part of each arm 300. Support structure 109 has a pair of first couplings 303. Each arm 300 also includes a respective second coupling 500 configured to releasably engage each respective first coupling 303 such that assembly 108 via arm 300 and couplings 303, 500 may be suspended from support structure 109. Actuation of cylinders 302 is controlled by motor 105 to provide a corresponding extension and retraction of rods 301 to raise and lower assembly 108 relative to supply conveyor 113 and mainframe 101.

Figure 6A:
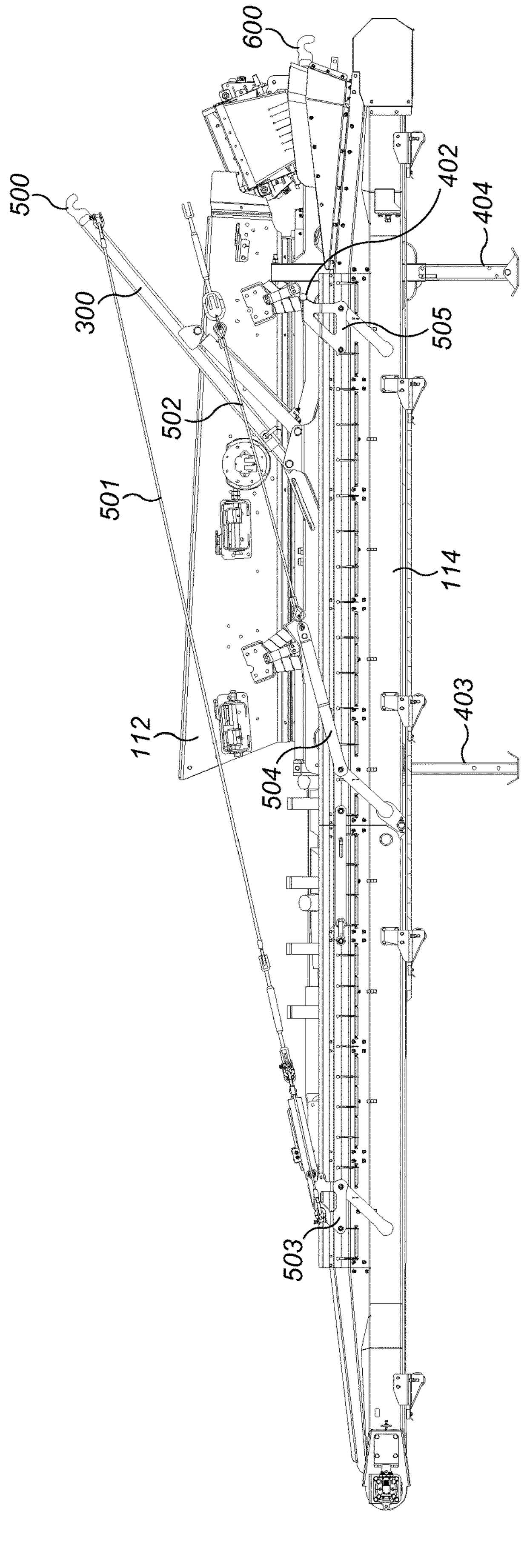
FIG. 6A is a side view of the hanging assembly of FIG. 5.

Carrier frame 110 includes a second pair of second couplings 600 as shown in FIG. 6A. Similarly, support structure 109 further includes a second pair of first couplings 304 spaced apart in a vertical direction from the first upper pair of couplings 303. Accordingly, carrier frame 110 is also configured to be mounted and dismounted from support structure 109 via interengagement between the further set of first and second couplings 304, 600.

Slewing arm 115 is mounted at support structure 109 via a slew ring 400 and is arranged to slew laterally outward between a forward facing position of FIG. 4 and a rearward facing position of FIG. 2. The distal end of arm 115 includes a further first coupling 401 releasably engageable with a further second coupling 402 mounted at recirculation conveyor 114. Accordingly, conveyor 114 is suspendable from slewing arm 115 via releasable engagement between first and second couplings 401, 402.

Hanging assembly 108 is demountably coupled to machine 100 and in particular mainframe 101 (and support structure 109) via respective engagement of the set of the first couplings 303, 304, 401 and the set of second couplings 500, 600, 402.

Assembly 108 includes a pair of rear jacking legs 404 and a pair of front support legs 403 with legs 403, 404 mounted at carrier frame 110 and is configured to contact the ground to support assembly 108 as an independent free standing unit from machine 100.

Figure 5:
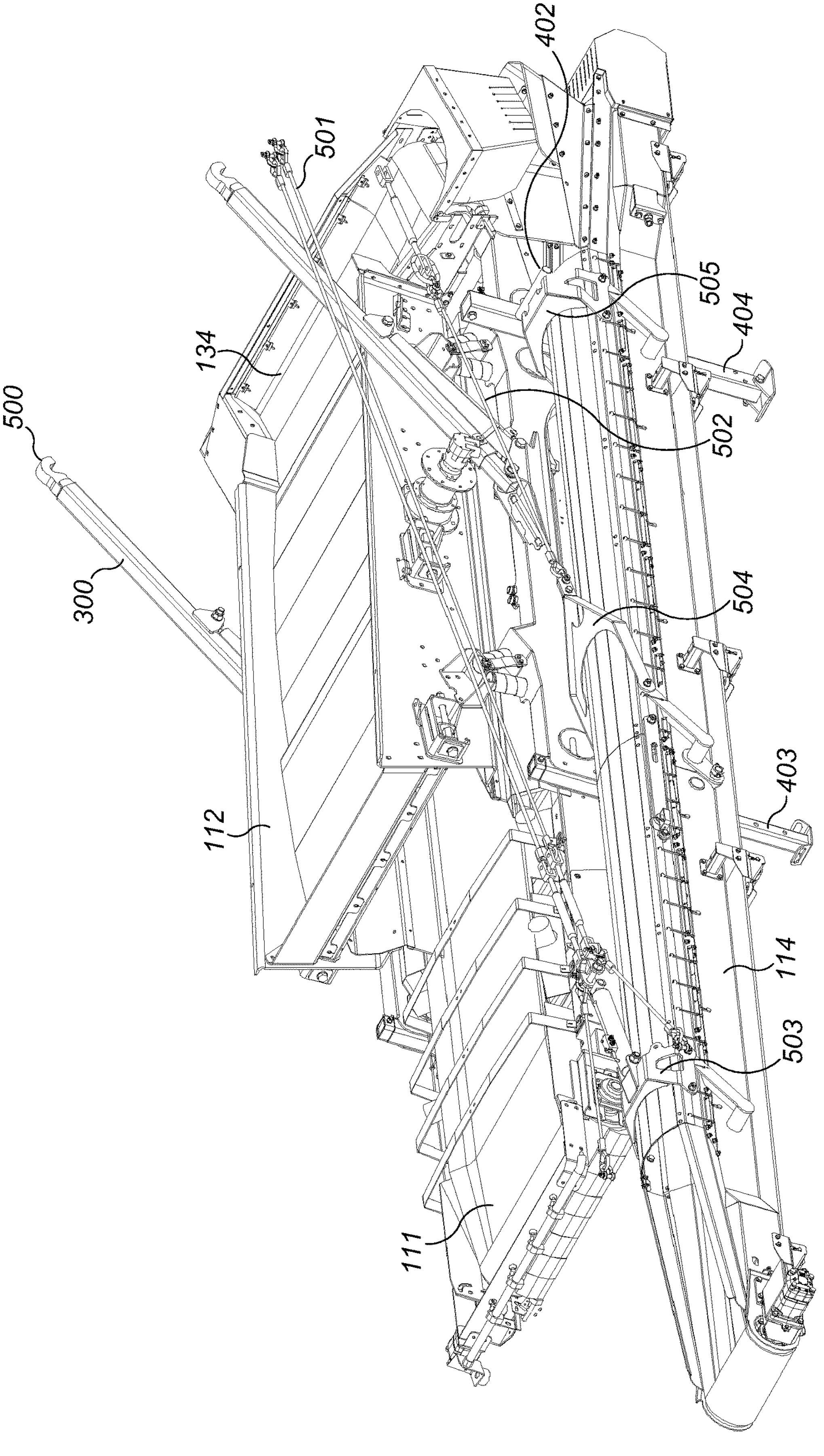
FIG. 5 is a perspective view of the hanging assembly of FIG. 4.
Figure 6B:
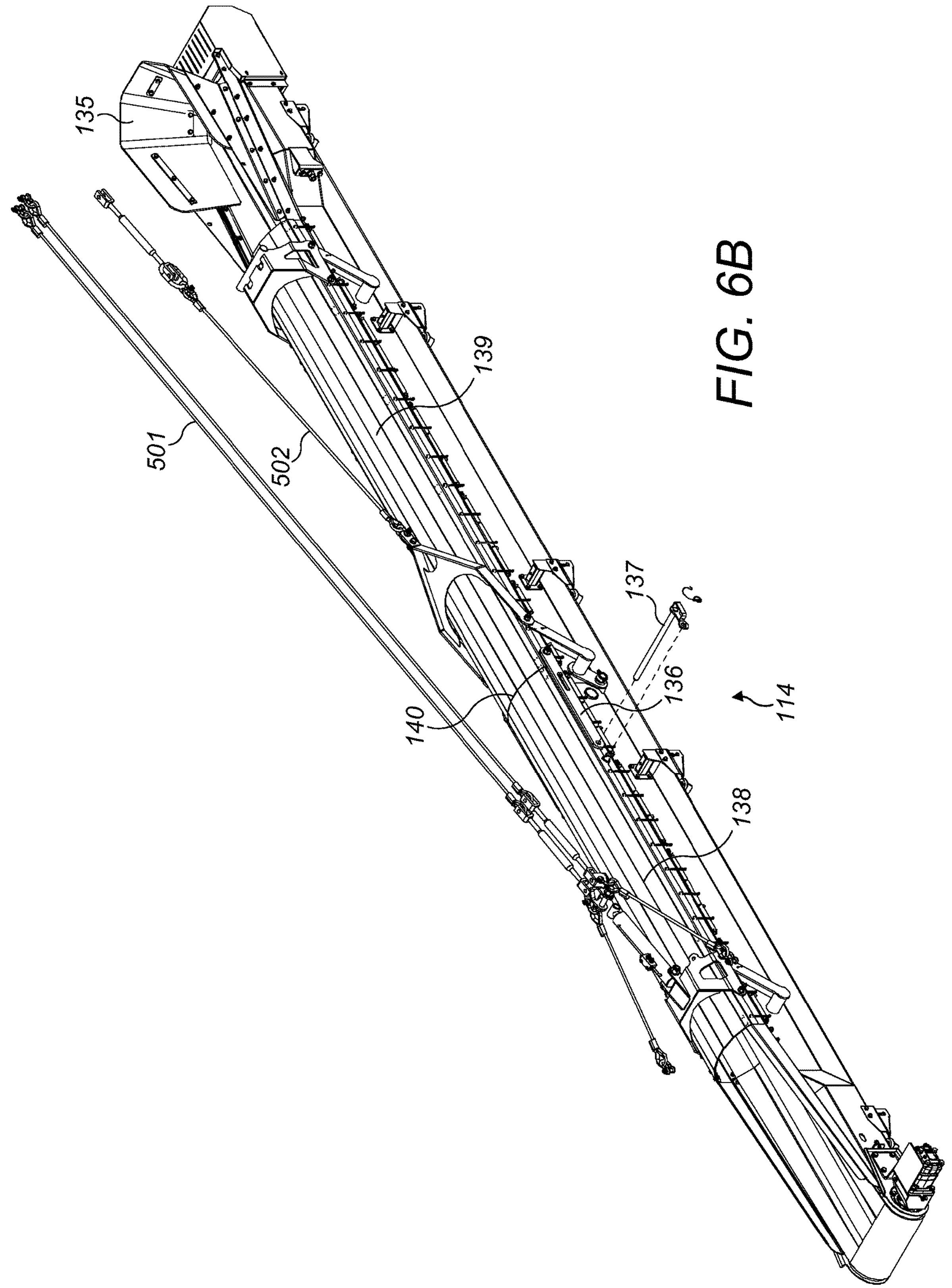
FIG. 6B is a perspective view of a recirculation conveyor forming part of the material processing machine of FIGS. 1 and 2.

Referring to FIGS. 5 and 6B, assembly 108 and in particular recirculation conveyor 114 is further supported at slewing arm 115 via a set of upper cables 501 and a lower cable 502. Upper cables 501 extend between a forward conveyor bracket 503 and a first slewing mount associate with slewing arm 115, whilst lower cable 502 extends between a rear conveyor bracket 504 (mounted at recirculation conveyor 114) and a lower attachment associated with slewing arm 115. Accordingly, when in use, the elongate length of recirculation conveyor 114 is supported by slewing arm 115 and cables 501, 502.

Figure 13A:
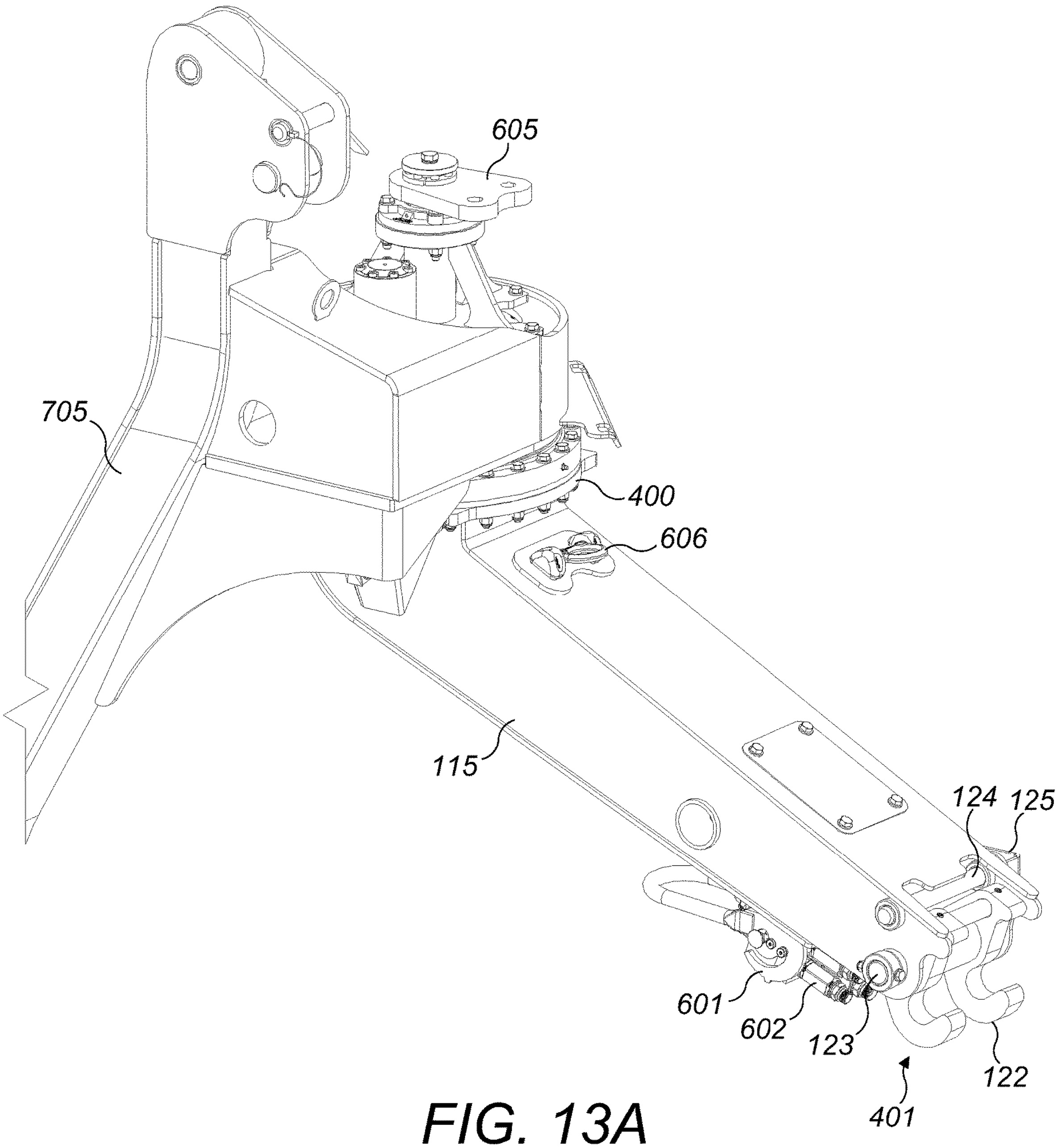
FIG. 13A is a perspective view of a slewing arm mounted at the support structure via a slew ring and having a first coupling provided at one end of the arm according to a specific implementation of the present disclosure.
Figure 13B:
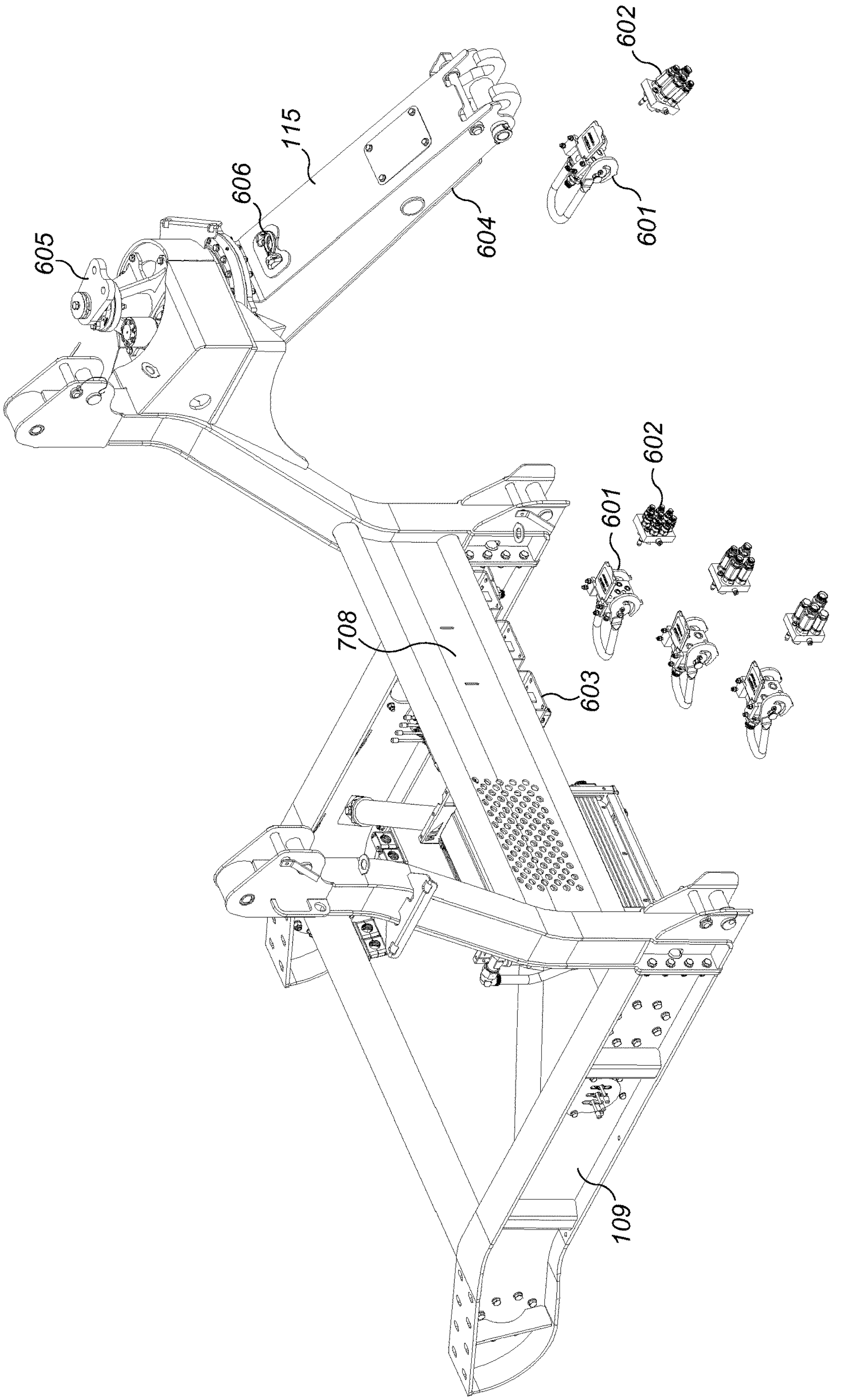
FIG. 13B is a partially exploded perspective view of the support structure of FIG. 7A, slewing arm of FIG. 13A and a plurality of hydraulic multi-connectors attachable to the support structure and slewing arm.

Referring to FIGS. 6B, 13A and 13B, primary cables 501 are secured to slewing arm 115 via a pivoting attachment bracket 605. Secondary cable 502 is secured to slewing arm 115 via a corresponding attachment bracket 606. To enable hanging assembly 108 to be completely decoupled from machine 100, cables 501, 502 are detached from their respective attachment brackets 605, 606. To configure for a transport mode, cables 501 may then be secured temporarily to a region of a feed boot 135, located at the rearward end of conveyor 114, with cable 502 secured to cables 501 via temporary fixings.

As shown in FIG. 6B, recirculation conveyor 114 includes a head section 138 pivotally connected to a tail section 139, with head and tail sections 138, 139 being pivotally mounted at junction 140. A coupling bracket 136 extends between head and tail sections 138, 139 at junction 140 and is fixed in position to lock the head and tail sections 138, 139 via a release pin 137. With release pin 137 in position, head section 138 is locked linearly to tail section 139.

Figure 7A:
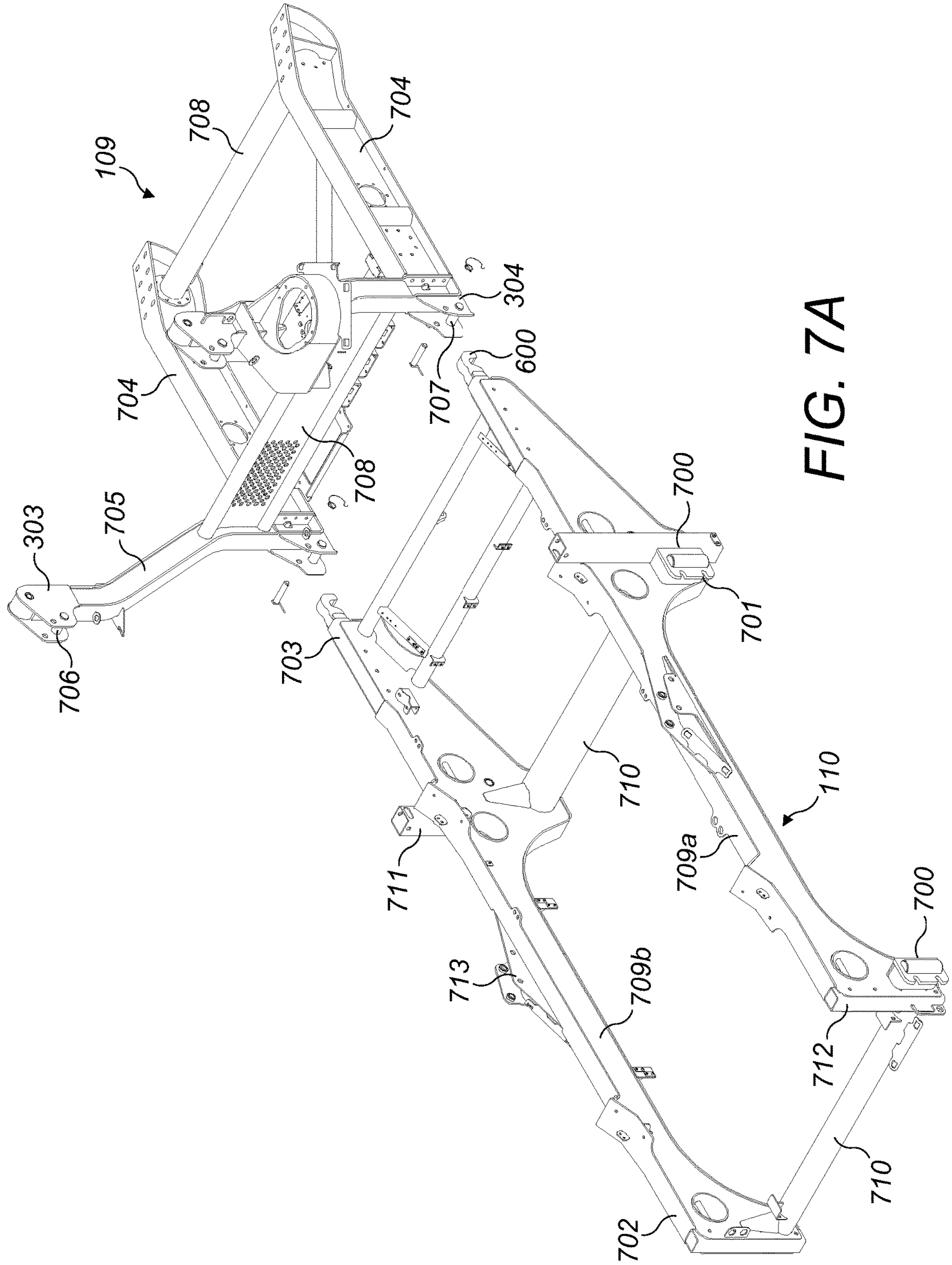
FIG. 7A is a perspective view of a carrier frame that mounts one or more processing units of the hanging assembly and a support structure mounted at the mainframe being connectable with the carrier frame.
Figure 8A:
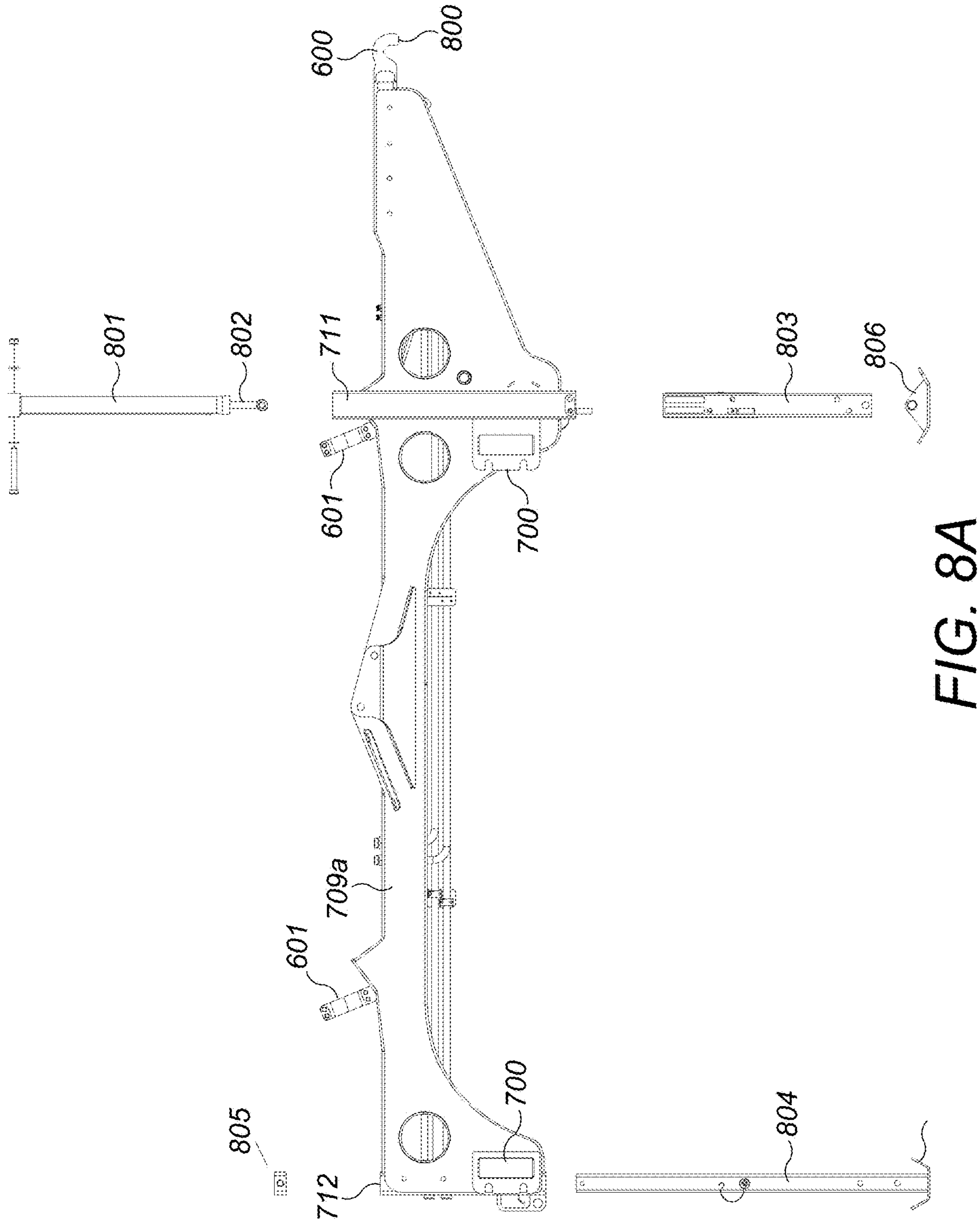
FIG. 8A is a side view of the carrier frame and jacking legs of FIG. 7A.

Referring to FIGS. 7A and 8A, carrier frame 110 is formed by a pair of elongate beams 709*a* and 709*b* having a forward end 702 and a rearward end 703. A plurality of cross struts 710 extend between beams 709*a* and 709*b* at intervals between the forward and rearward ends 702, 703. A pair of arm brackets 713 are each mounted at a substantially mid length region of each beam 709*a* and 709*b* to pivotally mount each respective arm 300 (and in particular rods 301) and cylinders 302. A pair of rear leg housings 711 are mounted respectively at and extend perpendicular to each beam 709*a* and 709*b* to accommodate a telescopically extendable stanchion 803 terminated at its lowermost end by a pivotally mounted ground engagement foot 806. A powered hydraulic cylinder 801 is mounted within each stanchion 803 and is in turn slidably mounted within each housing 711. A telescopic cylinder rod 802 is accordingly coupled to stanchion 803 such that by actuation of cylinder 801, stanchion 803 and foot 806 are configured to extend downwardly away from carrier frame 110.

Each carrier frame beam 709*a* and 709*b* also includes a front leg housing 712 to slidably mount a respective stanchion 804 terminated at its lowermost end by a corresponding foot 805. Each stanchion 804 is configured to slide in a vertical direction through housing 712 by manual actuation. Such a configuration enables the orientation of carrier frame 110 to be adjusted relative to the horizontal. Accordingly, the entire hanging assembly 108 may be both raised and lowered in a vertical plane and set at an inclined angle by actuation of cylinders 801 and the extension and retraction of stanchions 803 relative to carrier frame 110. Stanchions 804 are fixable at the desired extension or retraction position via a fixing pin 807. A corresponding fixing pin (not shown)

is also provided to mechanically lock stanchions 803 of the rear hydraulic jacking legs 404.

Figure 7B:
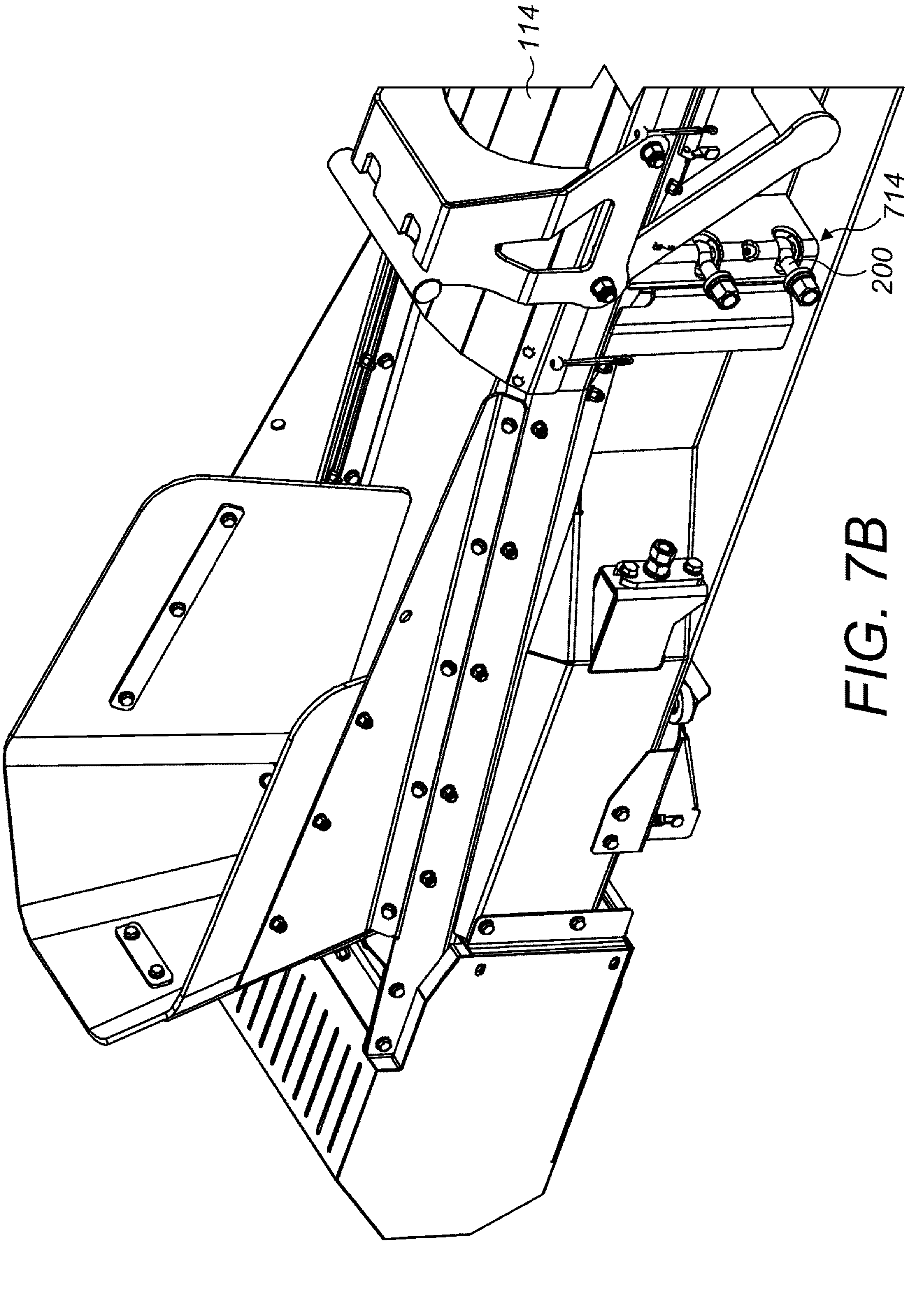
FIG. 7B is a perspective view of a side of the recirculation conveyor according to a specific implementation of the present disclosure.

Referring to FIGS. 7A, 7B and 8A, one of the carrier frame beams 709*a* includes a pair of anchorage flanges 700 each having a pair of notches 701. Recirculation conveyor 114 includes a corresponding pair of anchorage lugs 200 pivotally mounted via a pivot pin 714 such that when conveyor 114 is pivoted to position distal end 130 facing forward relative to machine forward end 107, conveyor 114 may be mechanically secured to carrier frame 110 via engagement of the pivoting of lugs 200 into notches 701. Accordingly, recirculation conveyor 114 is releasably attachable to carrier frame 110 so as to be capable of being raised and lowered with the assembly 108 as an integral component relative to mainframe 101 and support structure 109. Such independent raising and lowering accordingly necessitates disconnection between the first coupling 401 of slewing arm 115 and the second coupling 402 of conveyor 114 as detailed below.

Referring to FIG. 7A, support structure 109 includes a pair of elongate beams 704 spaced apart in a widthwise direction of machine 100 arranged to correspond to the spacing and alignment of the carrier frame beams 709*a* and 709*b*. Support structure beams 704 are connected by at least one cross beam 708. Support structure 109 also has a pair of generally upstanding posts 705 rigidly mounted at each end of each beam 704. Posts 705 are positioned and stabilised by a further cross beam 708. Each post 705 is terminated at its uppermost end by one of the first couplings 303 and at its lowermost end by one of the further first couplings 304. Each of the first couplings 303, 304 has a respective abutment formed by an axially short bar 706, 707.

Figure 8B:
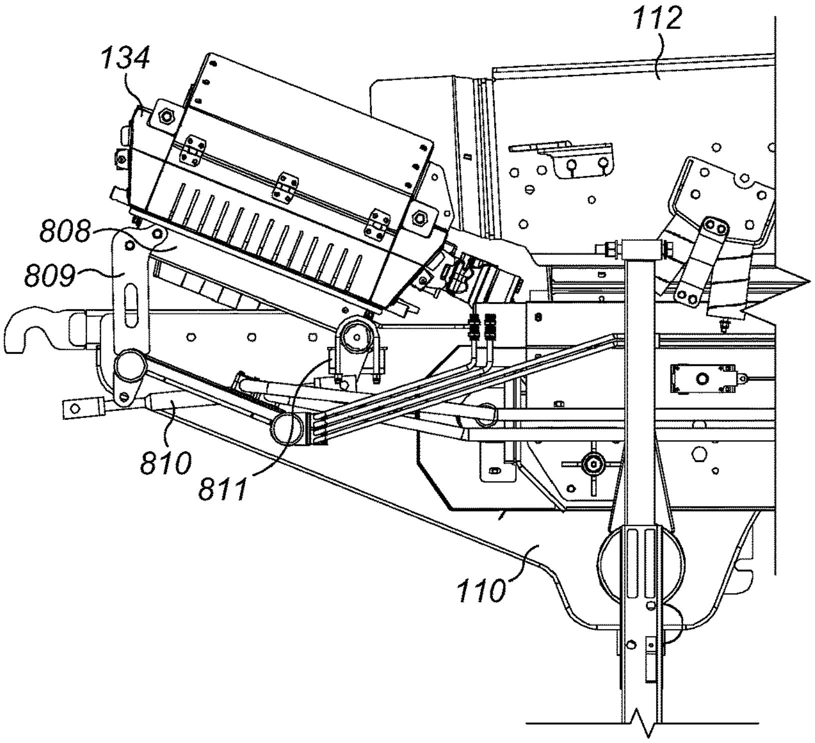
FIG. 8B is a side view of a rearward end of a screen and transfer conveyor in a use position forming part of the hanging assembly of FIGS. 3 to 5 according to a specific implementation of the present disclosure.
Figure 8C:
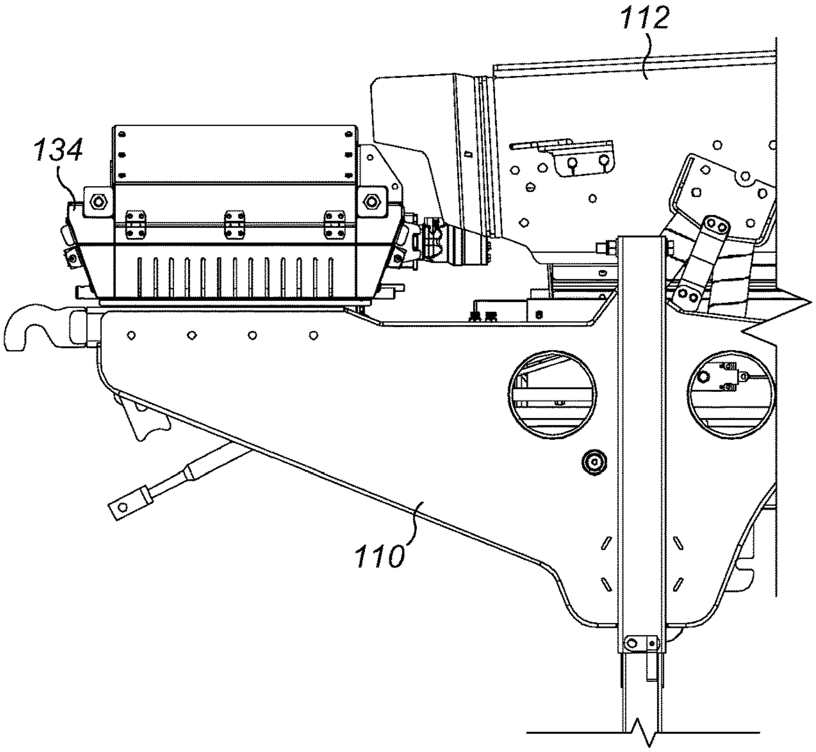
FIG. 8C is a side view of a rearward end of the screen and transfer conveyor of FIG. 8B in a maintenance position.

Referring to FIGS. 8B and 8C, transfer conveyor 134, positioned at the rearward end of screen 112, is configured to pivot from an inclined working position to a substantially horizontal position to allow maintenance access. Travel conveyor 134 is mounted at a transfer frame 808 that is in turn releasably secured to carrier frame 110 via a pair of U-bolts 811 positioned at each lengthwise end of conveyor 134. Additionally, an opposite side of conveyor 134 is adjustably mounted at carrier frame 110 via a pair of support brackets 809 that secure transfer conveyor 134 in the inclined (raised) position of FIG. 8B during operation. For maintenance, conveyor 134 may be moved to the horizontal alignment position of FIG. 8C via a turnbuckle 810 attached to conveyor 134. Accordingly, the range of movement of the transfer conveyor between the widthwise tilting orientation of FIG. 8B to the substantially horizontal alignment of FIG. 8C extends over 20 to 30°.

Figure 9:
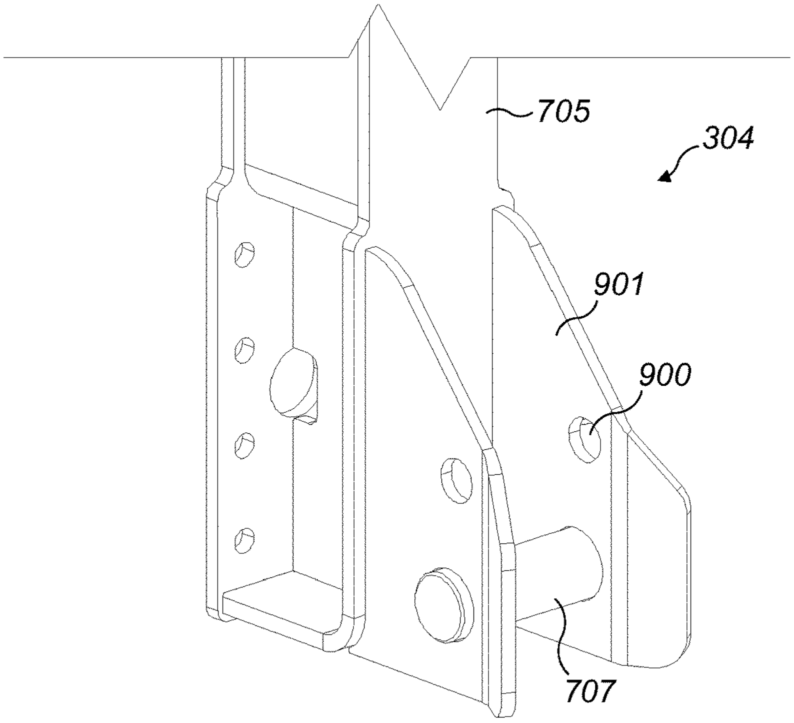
FIG. 9 is a perspective view of parts of a first coupling provided at the support structure.
Figure 10:
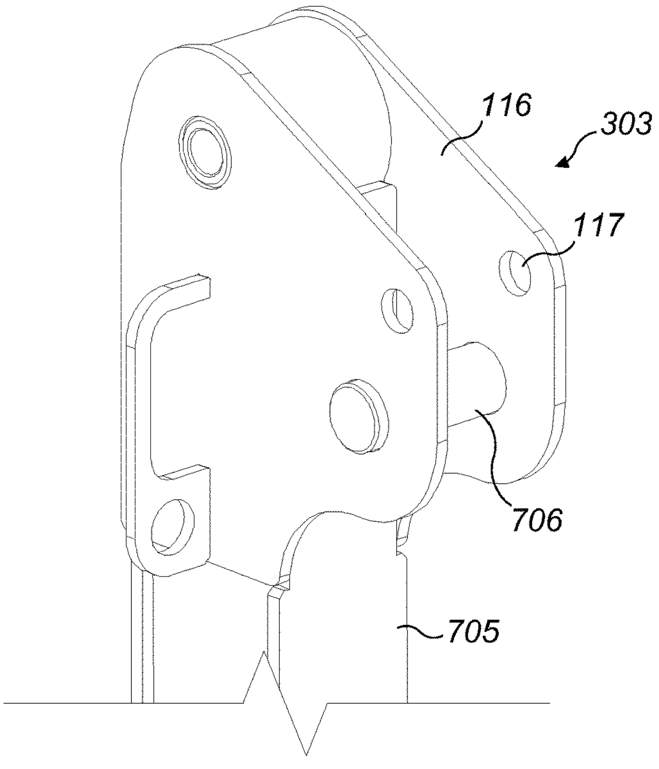
FIG. 10 is a perspective view of parts of a further first coupling provided at the support structure.
Figure 11:
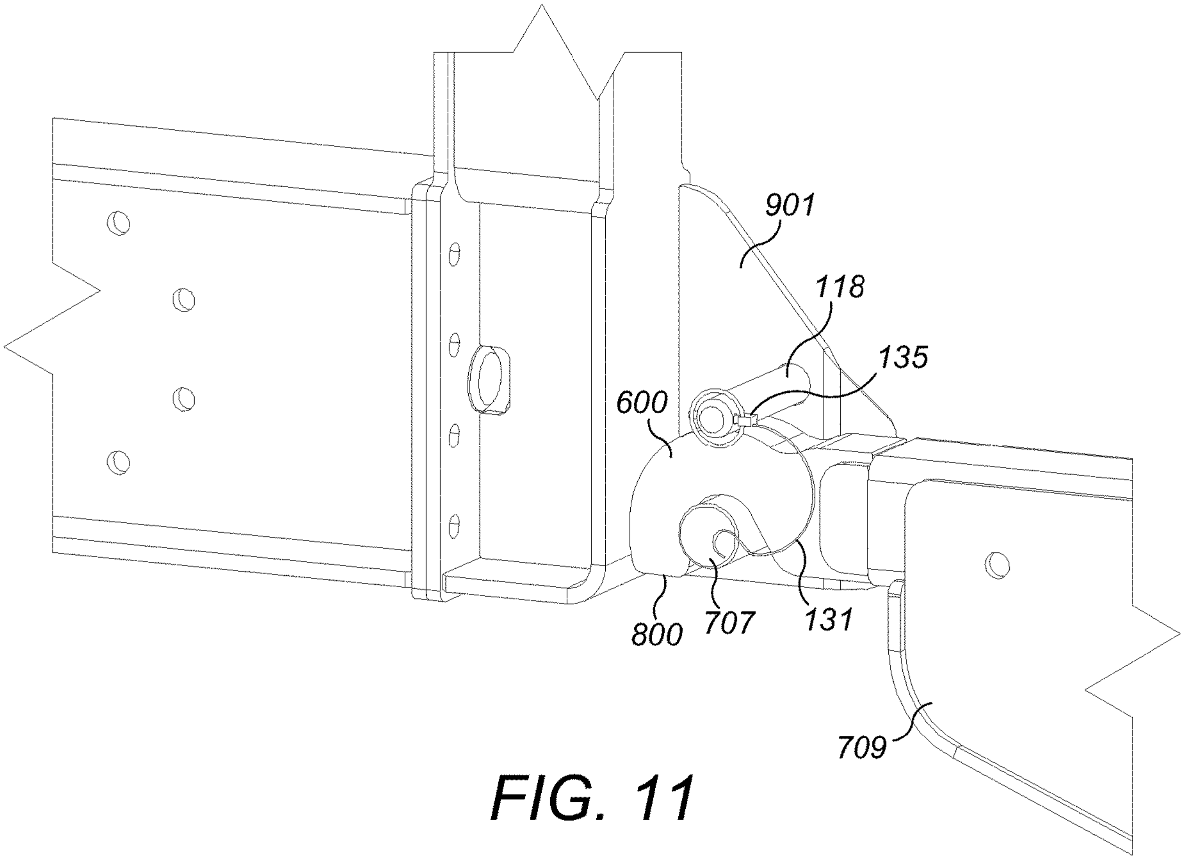
FIG. 11 is a perspective view of the engagement of a second coupling mounted at the carrier frame with a first coupling of the support structure.
Figure 12:
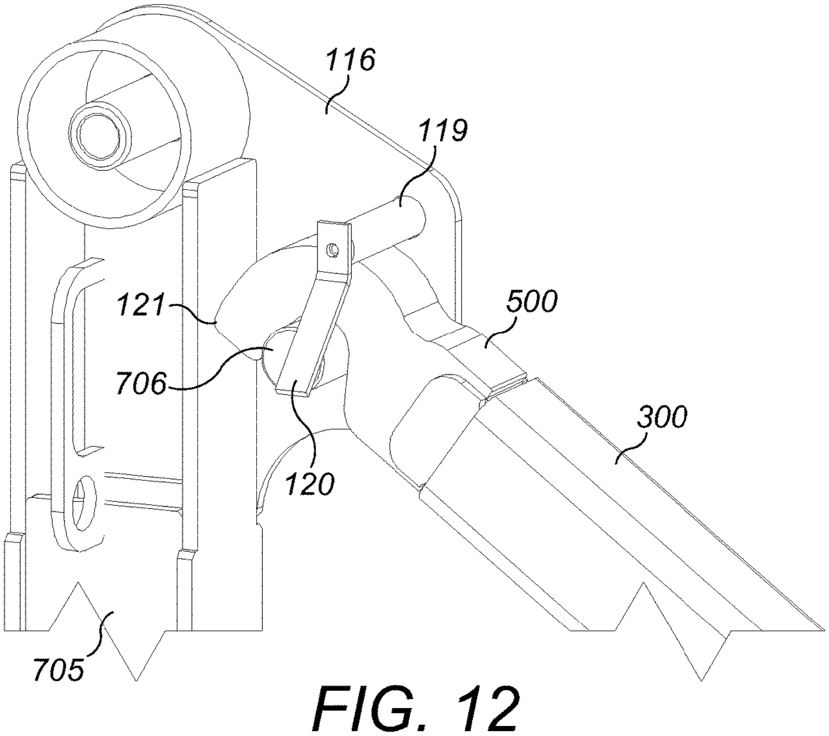
FIG. 12 is a perspective view of the engagement of an additional second coupling mounted at the carrier frame with a further first coupling of the support structure.

FIGS. 9 to 12 illustrate in more detail the respective connection and disconnection between the first and second couplings 303, 304, 500, 600. Referring to FIG. 9, the lower pair of first couplings 304 are formed by a pair of spaced apart flanges 901 with the bar 707 extending laterally between flanges 901. Each flange 901 also has an aperture 900 to releasably mount a locking pin 118. Similarly, and referring to FIG. 10, each of the upper first couplings 303 is formed by a pair of spaced apart flanges 116 with the bar 706 extending between flanges 116. Each flange 116 also has an aperture 117 to releasably receive a corresponding locking pin 119. Referring to FIGS. 11 and 12, hanging assembly 108 may be mounted and dismounted from support structure 109 via interengagement between the first and second couplings 303, 304, 500, 600. In particular, each of the second couplings 500, 600 comprises a hooked member 800 that may be releasably hooked around each bar 707. Similarly, each telescopic arm mounted second coupling 500 comprises a hooked member 121 that may be releasably hooked around each respective bar 706. When the respective first and second couplings are engaged as illustrated in FIGS. 11 and 12, attachment may be secured via insertion of the respective locking pins 118, 119 within apertures 900, 117 that are effect to abut at least a part of the first and second couplings thereby preventing any separating movement. Each locking pin 118, 119 has a handle 120 that may be conveniently grasped by an operator to lock and release the respective couplings in engagement. Each locking pin 118 includes a lynch pin 141 connected to handle 120 via a tether 131. In use, lynch pin 141 is removed from locking pins 118, 119 to enable pins 118, 119 to be removed and the hanging assembly 108 demounted from apparatus 100.

Figure 14:
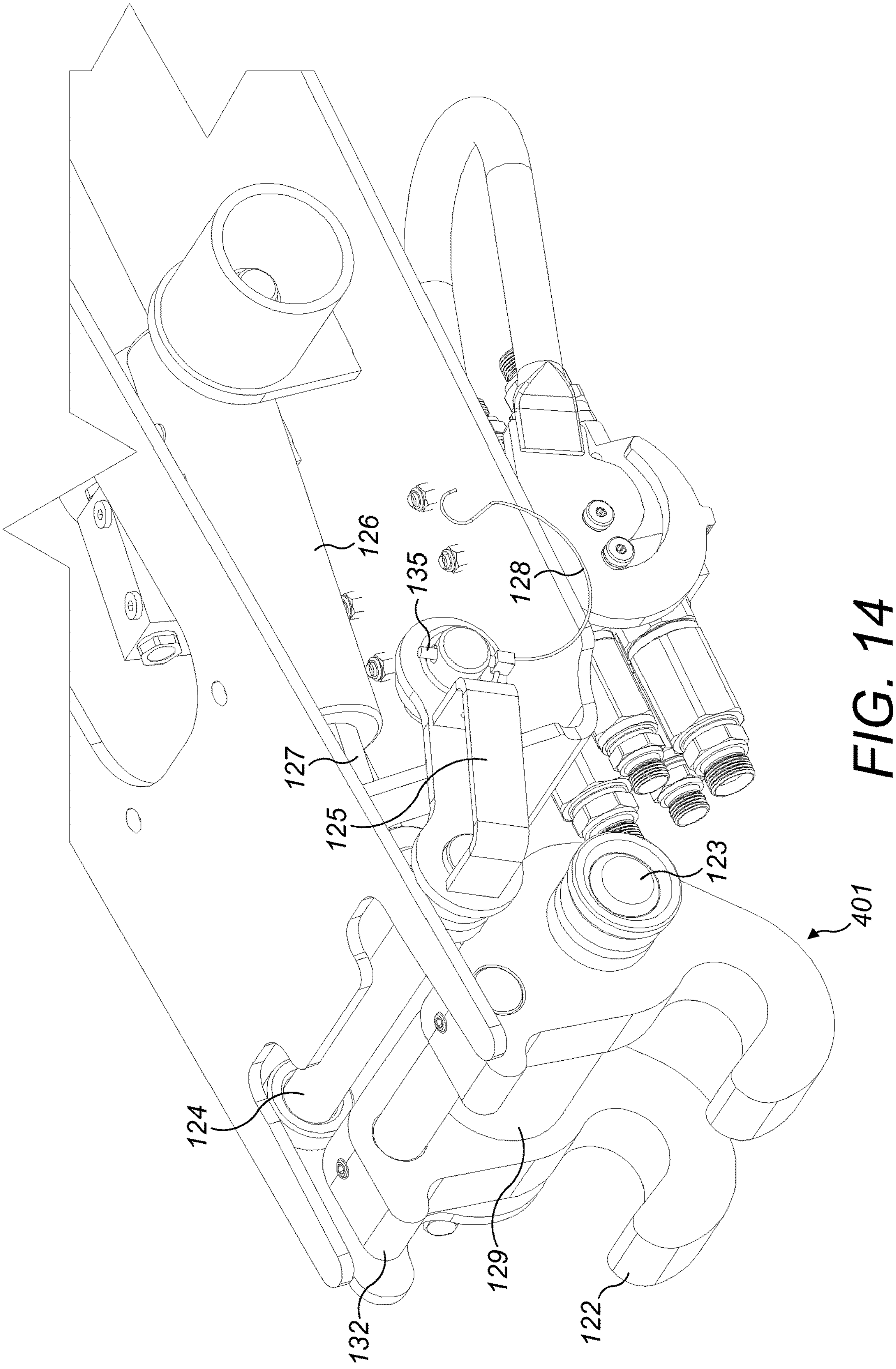
FIG. 14 is a perspective view of the first coupling provided at the end of the slewing arm of FIG. 13A.
Figure 15:
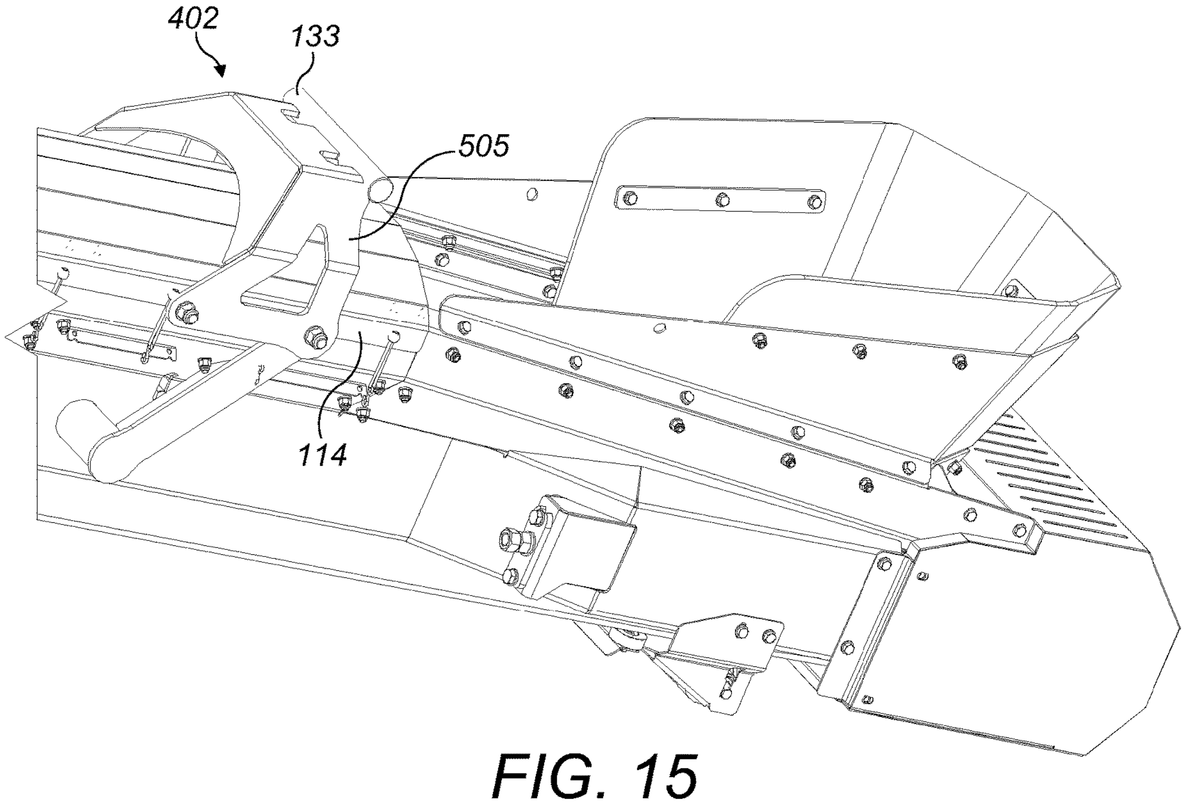
FIG. 15 is a perspective view of a second coupling mounted at the recirculation conveyor of FIGS. 1 to 6B.
Figure 16:
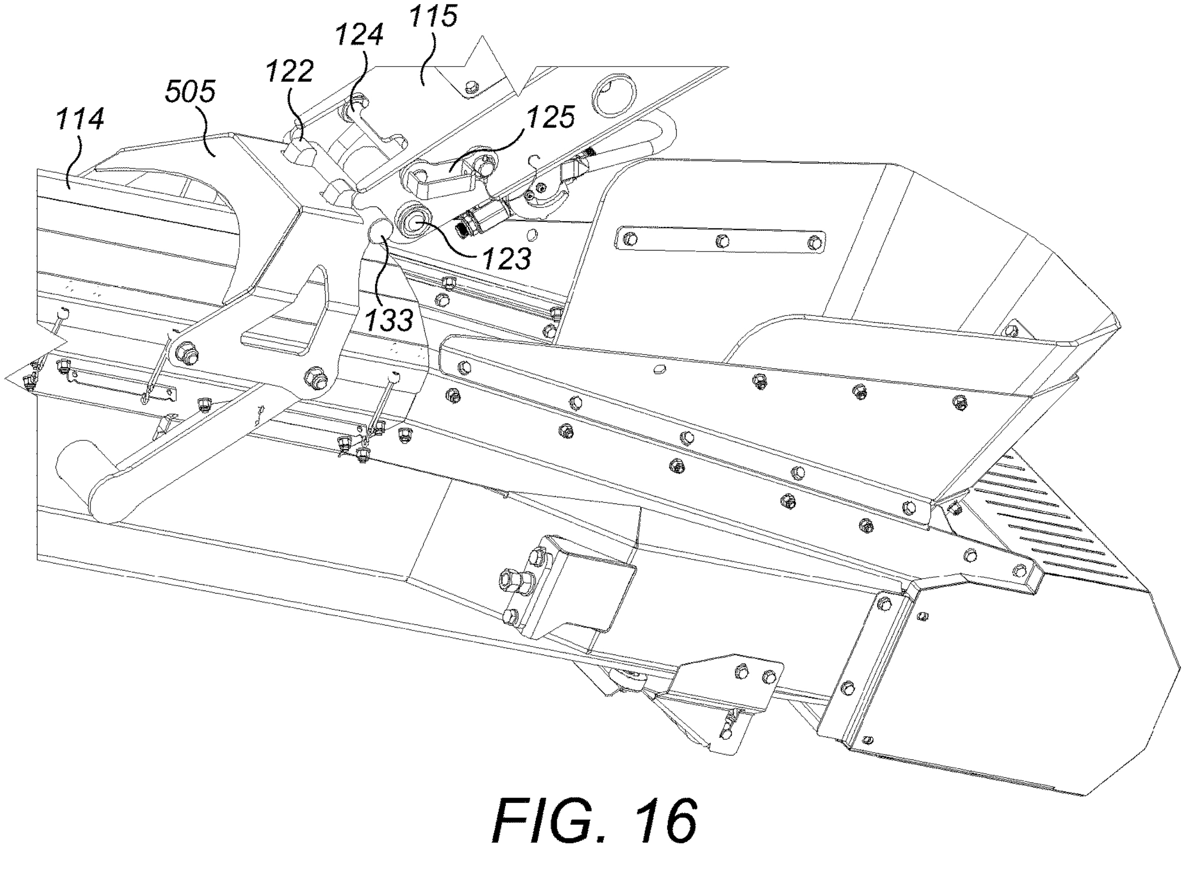
FIG. 16 is a perspective view of the first coupling of the slewing arm engaged in contact with the second coupling of the recirculation conveyor of FIG. 15.

FIGS. 13 to 16 illustrate in more detail the coupling between the recirculation conveyor 114 and the slewing arm 115. The first coupling 401 provided at the distal end of slewing arm 115 includes a claw like configuration formed by a pair of spaced apart hooked members 122. Each member 122 is mounted on a common barrel 129 that is in turn pivotally mounted about a pivot pin 123. Accordingly, each hooked member 122 is configured to rotate around pin 123 during engagement and disengagement with the second coupling 402 mounted at recirculation conveyor 114 via a mounting bracket 505. In particular, and referring to FIG. 15, the second coupling 402 includes a short bar 133 mounted at an upward facing region of bracket 505. Referring to FIG. 14, a powered hydraulic cylinder 126 is mounted internally within slewing arm 115 and includes a telescopic extendable rod 127 attached at one end to a region 132 of the hooked members 122. Accordingly, by linear extension and retraction of rod 127, hooked members 122 are configured to rotate about pin 123 to hook around bar 133. As illustrated in FIGS. 13 and 16, a locking pin 124 is removably insertable at the distal end of arm 115 adjacent hooked members 122 and configured to abut attachment region 132 to prevent hooked members 122 rotating about pin 123. Locking pin 124 includes a corresponding lynch pin 141 attached to handle 125 via tether 128 with lynch pin 141 being required to be withdrawn to allow pin 124 to be removed. Accordingly, with locking pin 124 inserted in position as illustrated in FIG. 16, slewing arm 115 is locked mechanically to recirculation conveyor 114. The coupling may be released by an operator grasping handle 125 positioned at one end of locking pin 124 and withdrawing pin 124 from contact with first coupling 401.

Cylinders 302 and 801 are powered by motor 105 and an intermediate pressurized fluid network (not shown) extending from machine 100 and connected to the assembly 108 via a plurality of quick release multi-connectors 601, 602. Cylinders 302 and 801 may be powered by an additional motor supported at mainframe 101 or carrier frame 110. Accordingly, cylinders 302 and 801 may be disconnected quickly and reliably from the fluid network via multi-connectors 601, 602.

Referring to FIG. 13B, a set of three multi-connector base units 601 are fixed to support structure 109 and in particular cross beam 708 via mounting brackets 603. A corresponding multi-connector base unit 601 is similarly attached to the distal end of slewing arm 115 at region 604. The respective multi-connector terminal units 602 may accordingly be connected and released from the respective base units 601 as will be appreciated.

In operation, the hanging assembly 108 may be suspended from mainframe 101 via support structure 109 as illustrated in FIG. 1 via the respective first and second couplings 303, 304, 500, 600, 401, 402. To decouple assembly 108, the recirculation conveyor head and tail sections 138, 139 are locked linearly with pin 137 inserted through bracket 136. The recirculation conveyor 114 may then be slewed via arm 115 to be brought into parallel alignment adjacent one side of carrier frame 110. Anchorage lugs 200 are then engaged within notches 701 to mechanically secure recirculation conveyor 114 to carrier frame 110. Cables 501, 502 are then decoupled from the respective attachment flanges 605, 606 and secured to feed boot 135.

Locking pin 124 is then removed via handle 125 and the first 401 and second 402 couplings are disengaged via actuation of cylinder 126. Arms 300 are then extended via actuation of cylinders 302. Support legs 403 may then be manually extended and pinned (locked in position). The entire hanging assembly 108 may then continue to be lowered from the position of FIGS. 1 and 2 to the position of FIGS. 3 and 4. Once locking pins 118, 119 are removed, cylinders 801 are then powered to extend stanchions 803 to raise the entire assembly 108 vertically to disengage bars 707. This lifting of the carrier frame 110 provides a corresponding disengagement of the second couplings 600, 500 from their respective first couplings 304, 303. Optionally, engagement and disengagement of the respective first and second couplings 303, 500 (associated with the telescopic arms 300) may be actuated by cylinders 302 alternatively or in addition to the actuation of the jacking legs 404 via cylinders 801. Leg locking pins (not shown) may then be engaged onto stanchions 803 to lock the jacking legs 404 in the fully extended and raised position such that the hanging assembly 108 is completely decoupled from machine 100 and is a free standing unit.

The mobile machine 100 may then be reversed rearwardly away from assembly 108 and reconnected via the reverse the procedure. The entire connection and disconnection of the assembly 108 represents an automated or semi-automated procedure that requires minimal manual intervention and obviates a need for any auxiliary lifting equipment. The present arrangement is also advantageous via the use of common motor 105 so as to be energy efficient and maintain to a minimum the overall weight of the apparatus.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A mobile bulk material processing apparatus comprising:

a mainframe having endless tracks or wheels arranged to move the apparatus;

a hanging assembly having at least one material processing unit and a carrier frame, the carrier frame being suspended from the mainframe via at least one support structure and including a plurality of support legs, the material processing unit including at least one screen and the hanging assembly further includes a discharge conveyor mounted below the screen;

a plurality of first couplings provided at the support structure and a plurality of complementary second couplings provided at the hanging assembly to releasably engage the first couplings to suspend the hanging assembly at the mainframe;

a plurality of power operated actuators acting on the first and/or second couplings and powered by a motor to move at least one of the first and second couplings relative to one another to provide powered engagement and disengagement between the first and second couplings and arranged to connect and disconnect the hanging assembly from the mainframe, the first and second couplings are configured to automatically couple and decouple from one another by movement controlled by the power operated actuators;

a slewing arm mounted at the support structure, the slewing arm mounting one of the plurality of first couplings and the hanging assembly includes a recirculation conveyor mounting one of the plurality of second couplings to releasably engage the one first coupling at the slewing arm, the slewing arm moving the recirculation conveyor laterally outward relative to the mainframe and bringing the recirculation conveyor into substantially parallel alignment with the carrier frame to allow the recirculation conveyor to be releasably and mechanically attached to one side of the carrier frame; and at least one telescopic arm on the hanging assembly mounted to extend from the carrier frame, the at least one telescopic arm including one of the second couplings, wherein the at least one telescopic arm is coupled to a respective power operated actuator to move the second coupling to provide powered engagement and disengagement of the hanging assembly with the mainframe to move the hanging assembly between a first position where the hanging assembly is connected to the mainframe and a second position wherein the hanging assembly is disengaged from the mainframe such that the hanging assembly is a free standing unit supported on the ground by the support legs.

2. The apparatus as claimed in claim 1, wherein at least some of the first and/or second couplings include hooked members and wherein at least some of the second and/or first couplings include abutments releasably engageable by the hooked members.

3. The apparatus as claimed in claim 2, wherein at least one of the power operated actuators being configured to act on the at least one hooked member in the respective coupling to pivot the hooked member into and from engagement with at least one of the first and/or second couplings mounted at the discharge conveyor at the hanging assembly.

4. The apparatus as claimed in claim 2, wherein the hanging assembly includes at least one pair of telescopic arms mounted to extend from the carrier frame, each arm including one of the second couplings.

5. The apparatus as claimed in claim 4, wherein the second couplings at the telescopic arms and the carrier frame include the hooked members.

6. The apparatus as claimed in claim 5, wherein the first couplings at the support structure include abutments releasably engageable by the hooked members at the telescopic arms and the carrier frame.

7. The apparatus as claimed in claim 6, wherein at least one pair of the power operated actuators are coupled to the respective telescopic arms to extend and retract the arms relative to the carrier frame to move the hooked members relative to the abutments.

8. The apparatus as claimed in claim 1, wherein the carrier frame at least one pair of second couplings provided at one end of the carrier frame.

9. The apparatus as claimed in claim 1, wherein the carrier frame includes a plurality of jacking legs arranged to be raised and lowered in contact with the ground to support the hanging assembly as a free standing unit on the ground, and a plurality of the power operated actuators coupled to the jacking legs to actuate the raising and lowering of the legs relative to the carrier frame.

10. The apparatus as claimed in claim 1, further comprising a plurality of locking members positioned at the first and/or second couplings to releasably lock the first and second couplings in engagement.

11. The apparatus as claimed in claim 1, further comprising a plurality of connectors arranged to allow the power operated actuators to be coupled and decoupled from a control fluid network provided at the mainframe.

12. The apparatus as claimed in claim 1, wherein the motor is mounted at the mainframe or the hanging screen assembly.

* * * * *